# United States Patent Office 2,895,496
Patented July 21, 1959

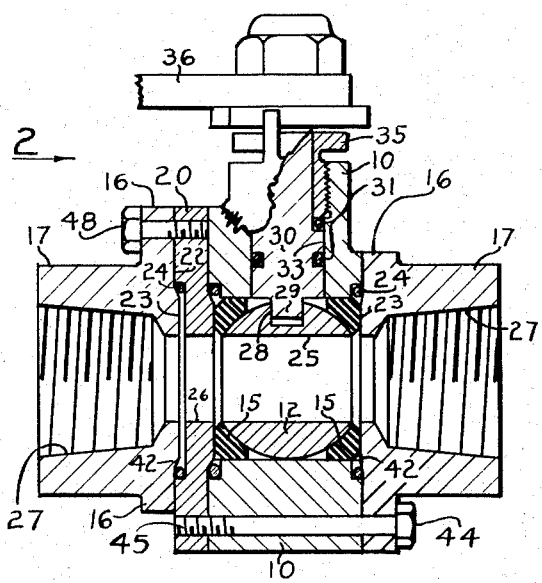

2,895,496

BALL VALVE AND UNION HAVING A DETACHABLE END FITTING

Robert E. Sanctuary, Shrewsbury, Mass., assignor to Worcester Valve Co., Inc., Worcester, Mass., a corporation of Massachusetts Application April 23, 1958, Serial No. 730,412

2 Claims. (Cl. 137—315)

This invention relates to ball valves, and more particularly to a ball valve construction which serves as a union in a pipe line.

Referring first to Fig. 3 of the drawings, it is sometimes required to remove a body, such as a filtering tank A, from a pipe line after closing valves B and C on each side of the tank and by-passing the fluid through a secondary circuit D so that the flow of fluid through the system may not be interrupted. It will be appreciated that restrictions of space and other limitations sometimes render it difficult to use in such a system the standard constructions, including unions, connecting nipples and pipes.

The primary object of this invention is to provide a valve which will serve not only its normal requirement of controlling fluid flow but also as a union, and thereby make it possible to close the valve and shut off the fluid flow at one side and to provide for ready removal of another portion of the line at the opposite side of the valve, so that the valve maintains its function for controlling the fluid flow at all times.

A further object is to provide a valve structure which includes removable end fittings for connecting into a pipe line and which is so constructed that a fitting may be removed without impairing the primary function of the valve for controlling the fluid flow. Further objects will be apparent in the following disclosure.

In accordance with my invention, I have provided a supplemental adapter plate interposed between the valve body and a removable end fitting which serves to form a valve end for holding the adjacent ball seat ring in place and which is removably connectable to a suitable valve end fitting, such as is shown in my copending application Serial No. 668,158 filed June 26, 1957. The valve may be of the general type and construction shown in my prior applications Serial #584,024, filed May 10, 1956, now U.S. Patent No. 2,858,098, and Serial No. 693,717, filed October 31, 1957, and various details of construction embodied in said applications may be employed herein, except as modified in accordance with the principles of this invention.

Referring to the drawings illustrating one embodiment of the invention:

Fig. 1 is a vertical section through the valve and its fittings taken on the line 1—1 of Fig. 2;

Fig. 2 is an end elevation of the valve showing the mounting of the fitting; and Fig. 3 is an elevation of a pipe line including a removable tank connected between two of the valves and showing a by-pass for the fluid when the tank has been removed.

The construction illustrated in the drawings comprises a hollow valve body 10 made of suitable material, such as bronze, which has, according to standard construction, a longitudinal bore for the passage of fluid and a bore perpendicular thereto within which the valve stem is mounted. An annular ball plug 12 having a part spherical surface is rotatably mounted in the fluid passage between two annular seat rings 15 which have suitably shaped faces adapted to interfit with the part spherical face of the ball 12 and stop the fluid flow when the ball is turned to a position at right angles to that shown in Fig. 1. In the constructions of my prior applications, a flanged portion 16 of an end fitting 17 is bolted to the valve body 10, and each seat ring 15 bears directly against an inner face of the adjacent removable end fitting 17, so that neither fitting can be removed without rendering the ball valve inoperative.

In accordance with my invention, I interpose an annular adapter plate 20 between the valve body and one end fitting. This plate has the double function of serving as a valve end for retaining the ball seat ring 15 in place as well as forming a removable union with the end fitting 17. Hence, by separation of the valve end flange 16 from the plate 20 at the adjacent side of the valve, the fitting 17 may be removed and yet the ball valve remains complete in its function.

The inner face portion of the valve end or adapter plate 20 is so constructed that the plate cooperates fully with the adjacent seat ring 15 to control the fluid flow, whether or not the associated fitting 17 has been removed. Thus, the removable fitting 17 is wholly independent of the valve control and serves only its primary purpose of being a fitting for the conduction of fluid to a connecting pipe in the system. The fitting 17 may be provided with suitable internal or external threads for connecting into a pipe line, and any of the various multi-way fittings of my prior application Serial #668,128 may be used, since the adapter plate will have a suitably shaped face for interfitting with the duplicate inner faces of the various fittings.

The contacting junction surfaces of the fitting 17 and the valve end plate 20 are provided with parallel faces and so shaped that the fitting 17 may slide transversely relative to the adjacent plate 20 and be removed without material interference. Although the inner surface of the fitting is shown as having a slight inwardly projecting boss 23, which aids in holding an elastomeric O-ring 24 in place for the purpose of preventing escape of fluid outwardly along the line of the joining surfaces 22, yet there is sufficient resiliency in the pipe line to provide for the separation, or the projecting boss may be omitted.

The valve ball, which need not be described in detail, comprises the annular body 12 having a part spherical surface and a bore 25 therethrough providing for the flow of fluid to the cylindrical passage 26 in the end plate 20 which communicates with the threaded passage 27 within the end fitting 17. The seat rings 15 are suitably shaped for the purpose, and they are made of an elastomeric material, such as a "teflon" plastic or a hard vulcanized rubber composition, which has sufficient resiliency and yet stiffness to insure an adequate stoppage of fluid flow when the ball is turned to close the valve. The ball has a transverse slot 28 in its upper portion into which is interfitted a lug 29 on the lower end of the valve stem 30 which is rotatably fitted within the vertical cylindrical opening of the valve body. Suitable O-rings 31 prevent the escape of fluid upwardly around the valve stem. The stem 30 is held in position by means of a flange 33 located between the two O-rings 31 and is held in place by the retainer 35 threaded into the top of the valve body 10. The valve ball is turned by means of a handle 36 suitably connected to the stem 30.

The outer face of the annular valve end plate 20 is parallel with the inner face of the adjacent fitting 17. The plate 20 is preferably recessed and arranged to carry the O-ring 24 outside of the boss 23 as shown. The O-ring is clamped between the adjacent faces of parts 17 and 20 and so prevents the escape of fluid outwardly along the junction of those faces. At the other side, the O-ring is between the fitting 17 and the valve body. If desired, the boss 23 of the fitting may be beveled at 42 so as to make it easier to slide the removable fitting out of position. As shown, the valve body 10 has its opposite end faces around the fluid passage shaped alike for interfitting with the inner face of the end plate 20 at one side and the fitting 17 at the other side. Hence, the plate 20 may be located on either side.

The end plate 20 is shown as a circular disk of substantially cylindrical shape held tightly in place on the valve body by means of bolts or cap screws 44. It is preferred to use cap screws and to locate their heads on the opposite side from the end fitting 17 that is to be removed, so as not to interfere with removal of the fitting. That is, the other end of each screw is threaded at 45 into the end plate 20, and there is no projecting head on this side. Each end fitting 17 has ears on its flange 16 fastened in place by cap screws 48 which are threaded into the body 10 at the right. The cap screw 48 at the left may pass through the plate 20 and be threaded into the valve body, but as shown, it passes inwardly only into the adjacent valve end 20. Thus, it is merely necessary to remove the set of cap screws 48 at the one side of the valve to provide for removal of the end fitting 17 from the plate 20 at that side without disturbing the valve operation, since the end plate 20 remains operative to hold the seat ring 15 against the valve ball. The cap screws 44 are located between the ears and are readialy accessible.

It will be appreciated that, if desired, an end plate 20 may be mounted at both sides of the valve body, or a single plate 20 may be mounted interchangeably on either side. Ordinarily, only one plate 20 is required, since the valve may be turned end for end to locate the plate at that end which is to carry the removable fitting 17.

It will now be seen by reference to Fig. 3 that if it is desired to remove the tank A from the system, it is merely necessary to open the valve E in the by-pass line D and then close the valves B and C. Removal now of the cap screws 48 at the inner sides of the valves B and C adjacent the tank, which connect the end fittings 17 to the valve body makes it possible to lift the tank A with its associated fittings 17 away from the valve bodies and yet leave the valves B and C fully closed and the fluid flowing uninterruptedly through the by-pass. The fittings 17 remain connected to the tank and they slide transversely of the valve end plates 20 as they are removed. After the filter unit has been cleaned, it may be inserted into the line by the reverse procedure. Thus the valves B and C, because of their adapter and plates 20, serve not only as valves but as unions in the line and make it unnecessary to provide the standard forms of unions and the supplemental pipe parts for this purpose.

Various modifications may be made in the valve construction within the scope of this invention, and it is to be understood that the shapes and constructions of the various features of the valve as above described are not critical, except as regards the primary feature of this invention relating to the lateral detachability of the end fitting when the valve is mounted in a pipe line and the fact that an end plate is removable for inserting the ball and seat rings and thereafter serves as a retainer for the adjacent seat ring. The end plate is a part of the valve and is not a fitting, in that it will not serve for connecting the valve into the line except in its cooperation with another part which is the end fitting. Also, it will be noted that the O-ring seal is located in a recess in the outer side of the end plate which insures that the O-ring is located inside of the contiguous faces of the fitting and plate so that it cannot interfere with the lateral sliding of the detachable end fitting. The above disclosure of a preferred embodiment is not to be interpreted as imposing limitations upon the scope of the claims appended hereto.

I claim:

1. A ball valve comprising a valve body having opposite annular end faces and a fluid passage therethrough, an annular valve ball having a part spherical surface which is movably mounted in the passage to open and close said passage, annular seat rings interfitting with the ball annulus and surrounding the fluid passage on the opposite sides of the ball, removable end fittings at the opposite sides of and carried by the body, a removable annular end plate between the body and an end fitting which has an inner surface contacting and retaining an adjacent seat ring in an operative association with the ball, the plate and the associated fitting having substantially parallel, slidably separable, interfitting faces, a set of fasteners for removably securing the plate to the body and a separate set of independently removable fasteners for securing the adjacent end fitting to the plate, said slidably separable fitting and its fasteners providing for lateral removal of the fitting from the adjacent plate without interference with the function of the valve to control the fluid flow at the remaining fitting.

2. A valve according to claim 1 comprising elastomeric sealing rings mounted on opposite sides of the plate adjacent to the valve body and the associated fitting to form fluid seals, and wherein the removable end fitting has spaced projecting ears carrying its fasteners and the plate fasteners are located between the ears so that the adjacent fitting may be independently removed.

References Cited in the file of this patent

UNITED STATES PATENTS

| 1,616,386 | O'Stroske | Feb. 1, 1927 |

FOREIGN PATENTS

| 149,684 | Australia | Jan. 19, 1953 |